United States Patent
Takaoka et al.

(10) Patent No.: US 8,870,987 B2
(45) Date of Patent: Oct. 28, 2014

(54) FAILURE DETECTING APPARATUS FOR PARTICULATE FILTER

(75) Inventors: Kazuya Takaoka, Susono (JP); Daisuke Shibata, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/142,984

(22) PCT Filed: Nov. 12, 2010

(86) PCT No.: PCT/JP2010/070222
§ 371 (c)(1),
(2), (4) Date: Jun. 30, 2011

(87) PCT Pub. No.: WO2012/063364
PCT Pub. Date: May 18, 2012

(65) Prior Publication Data
US 2013/0213236 A1    Aug. 22, 2013

(51) Int. Cl.
| | | |
|---|---|---|
| B01D 50/00 | (2006.01) |
| B01D 39/06 | (2006.01) |
| B01D 39/14 | (2006.01) |
| B01D 39/20 | (2006.01) |
| B01D 24/00 | (2006.01) |
| F01N 11/00 | (2006.01) |
| F01N 9/00 | (2006.01) |

(52) U.S. Cl.
CPC ............. *F01N 11/00* (2013.01); *F01N 2550/04* (2013.01); *F01N 2900/1606* (2013.01); *F01N 2900/1402* (2013.01); *Y02T 10/47* (2013.01); *F01N 2560/05* (2013.01); *F01N 9/002* (2013.01)
USPC ................... 55/283; 55/522; 55/523; 55/524; 422/169; 422/170; 422/171; 422/172; 422/177; 422/178; 422/179; 422/180; 422/181; 422/182

(58) Field of Classification Search
CPC ......... Y02T 10/47; F01N 9/002; F01N 11/00; F02D 41/1466; B01D 41/04; B01D 45/00; B01D 50/00; B01D 46/00; B01D 50/002; B01D 50/004; B01D 50/006
USPC .................... 55/522–524, 283; 422/169–172, 422/177–182
See application file for complete search history.

(56) References Cited

U.S. PATENT DOCUMENTS

| | | | |
|---|---|---|---|
| 2006/0254265 A1* | 11/2006 | Odajima et al. ................ | 60/297 |
| 2007/0089399 A1* | 4/2007 | Rhodes et al. ................. | 60/278 |
| 2009/0301062 A1 | 12/2009 | Sumida et al. | |
| 2010/0018186 A1 | 1/2010 | Shibata et al. | |
| 2011/0314792 A1 | 12/2011 | Shibata et al. | |

FOREIGN PATENT DOCUMENTS

| | | |
|---|---|---|
| EP | 2 551 479 | 1/2013 |
| JP | 2005/325612 | 11/2005 |

(Continued)

*Primary Examiner* — Amber Orlando
(74) *Attorney, Agent, or Firm* — Finnegan, Henderson, Farabow, Garrett & Dunner, LLP (57) ABSTRACT

An object of the present invention is to detect any breakdown or failure of a particulate filter more appropriately. A failure detecting apparatus for detecting failure of a particulate filter according to the present invention comprises an acquiring section which acquires an amount of PM contained in an exhaust gas allowed to outflow from the particulate filter; a regeneration process executing section which executes a filter regeneration process for oxidizing and removing PM deposited in the particulate filter; and a failure judging section which judges that the particulate filter is in the failure state if a decreased amount of the amount of PM contained in the exhaust gas acquired by the acquiring section, during a predetermined period of time as started from a point in time at which the execution of the filter regeneration process performed by the regeneration process executing section is completed, is not equal to or larger than a predetermined reference amount.

2 Claims, 5 Drawing Sheets

(56) References Cited

FOREIGN PATENT DOCUMENTS

| | | |
|---|---|---|
| JP | 2007-315275 | 12/2007 |
| JP | 2007-327392 | 12/2007 |
| JP | 2009-293518 | 12/2009 |
| WO | WO 2010/097893 | 9/2010 |
| WO | WO 2011/144977 | 11/2011 |

\* cited by examiner

FAILURE DETECTING APPARATUS FOR PARTICULATE FILTER

CROSS-REFERENCE TO RELATED APPLICATIONS

This application is a national phase application of International Application No. PCT/JP2010/070222, filed Nov. 12, 2010, the contents of which are incorporated herein by reference.

TECHNICAL FIELD

The present invention relates to a failure detecting apparatus for detecting any breakdown or failure of a particulate filter provided in an exhaust gas passage of an internal combustion engine.

BACKGROUND ART

A technique is known, wherein a particulate filter (hereinafter simply referred to as "filter"), which traps the particulate matter (hereinafter referred to as "PM") contained in an exhaust gas, is provided in an exhaust gas passage of an internal combustion engine.

A technique is disclosed in Patent Document 1, which is usable when a PM trapper (corresponding to the filter) is provided in an exhaust gas passage of an internal combustion engine, wherein any breakdown or failure of the PM trapper is detected on the basis of an amount of change of the differential pressure between the upstream and the downstream of the PM trapper brought about in accordance with the change of the operation state of the internal combustion engine.

A technique is disclosed in Patent Document 2, wherein any filter breakdown or failure is checked or diagnosed on the basis of a detected value of a particulate amount detection sensor provided in an exhaust gas passage at a portion disposed on the downstream side from a filter. In the technique described in Patent Document 2, the breakdown check for the filter is prohibited if a condition, under which the PM trapping efficiency of the filter is decreased to be lower than a predetermined value, is established.

Further, the following fact is described in Patent Document 2. That is, PM, which has a particle size (grain diameter) smaller than a mesh size of the filter, passes through the filter during a certain period of time after the regeneration or renewal. Therefore, the PM trapping efficiency of the filter is lowered. When a certain amount of PM is accumulated or deposited, and the meshes of the filter are progressively filled therewith, then the PM trapping efficiency is recovered.

PRIOR ART DOCUMENTS

Patent Documents

Patent Document 1: Japanese Patent Application Laid-Open No. 2007-327392
Patent Document 2: Japanese Patent Application Laid-Open No. 2007-315275

SUMMARY OF THE INVENTION

Problem to be Solved by the Invention

In order that the differential pressure of the filter between the upstream and the downstream has distinctly different values between the normal state and the failure state of the filter, it is necessary that PM of a certain degree of amount should be deposited in the filter. The amount of deposition of PM in the filter is extremely small immediately after the completion of the execution of the filter regeneration process for removing PM deposited in the filter. Therefore, it is difficult to detect the breakdown or failure of the filter on the basis of the differential pressure between the upstream and the downstream of the filter immediately after the completion of the execution of the filter regeneration process. Further, in order to detect the differential pressure between the upstream and the downstream of the filter, it is necessary to provide pressure sensors on both of the upstream side and the downstream side of the filter.

The present invention has been made taking the foregoing problems into consideration, an object of which is to detect any breakdown or failure of a filter more appropriately.
[Means for Solving the Problem]

Means for Solving the Problem

In the present invention, any breakdown or failure of a filter is detected on the basis of the change of PM amount (hereinafter referred to as "outflow PM amount" in some cases) contained in an exhaust gas allowed to outflow from the filter immediately after the completion of execution of a filter regeneration process.

In particular, the failure detecting apparatus for detecting the failure of the particulate filter according to the present invention resides in a failure detecting apparatus for detecting failure of a particulate filter which is provided in an exhaust gas passage of an internal combustion engine and which collects particulate matters contained in an exhaust gas, the failure detecting apparatus comprising:

an acquiring section which acquires an amount of PM contained in the exhaust gas allowed to outflow from the particulate filter;

a regeneration process executing section which executes a filter regeneration process for oxidizing and removing PM deposited in the particulate filter; and a failure judging section which judges that the particulate filter is in the failure state if a decreased amount of the amount of PM contained in the exhaust gas acquired by the acquiring section, during a predetermined period of time as started from a point in time at which the execution of the filter regeneration process performed by the regeneration process executing section is completed, is not equal to or larger than a predetermined reference amount.

The PM trapping efficiency of the filter is lowered at the point in time at which the execution of the filter regeneration process is completed. PM is trapped and deposited in the filter from the point in time immediately after the completion of the execution of the filter regeneration process, and thus the PM trapping efficiency is raised. Therefore, if the filter is normal, the outflow PM amount is decreased as the time elapses immediately after the execution of the filter regeneration process.

However, when any breakdown or failure of the filter arises, the PM trapping efficiency of the filter is scarcely raised after the completion of the execution of the filter regeneration process. Therefore, the outflow PM amount is not decreased as well.

In view of the above, in the present invention, the failure judging section judges that the filter is in the failure state if a decreased amount of the outflow PM amount acquired by the acquiring section, during the predetermined period of time as started from the point in time at which the execution of the filter regeneration process is completed, is not equal to or larger than the predetermined amount. The predetermined period of time herein refers to the period of time including at least a part of the period of time in which the PM trapping efficiency is raised as the time elapses if the filter is normal. The predetermined reference amount refers to the threshold value of the decreased amount in the outflow PM amount with which it can be judged that the filter is normal.

According to the present invention, it is possible to immediately detect the failure of the filter after the completion of the execution of the filter regeneration process. Further, it is possible to detect the failure of the filter at a higher accuracy.

In the present invention, the failure judging section may compare the amounts of outflow PM acquired by the acquiring section at least at two points when substantially identical operation states of the internal combustion engine are provided during the predetermined period of time, and the failure judging section may judge that the particulate filter is in the failure state if the decreased amount of the amount of outflow PM is not equal to or larger than the predetermined reference amount.

Even when the states of the filter are identical with each other, if the operation states of the internal combustion engine are different from each other, then the outflow PM amount is any different amount in some cases. According to the invention as described above, it is judged whether or not the filter is in the failure state by comparing the outflow PM amounts provided in the same operation state. Therefore, it is possible to further improve the accuracy of the failure detection for the filter.

Advantageous Effect of the Invention

According to the present invention, it is possible to detect the breakdown or failure of the filter more appropriately.

EMBODIMENTS FOR CARRYING OUT THE INVENTION

A specified embodiment of the present invention will be explained below on the basis of the drawings. For example, sizes (dimensions), materials, and shapes of constitutive parts or components as well as relative arrangements thereof, which are described in this embodiment, are not intended to limit the technical scope of the invention only thereto, unless otherwise specified.

<Embodiment>
<Schematic Arrangement of Exhaust System of Internal Combustion Engine>

Figure 1:
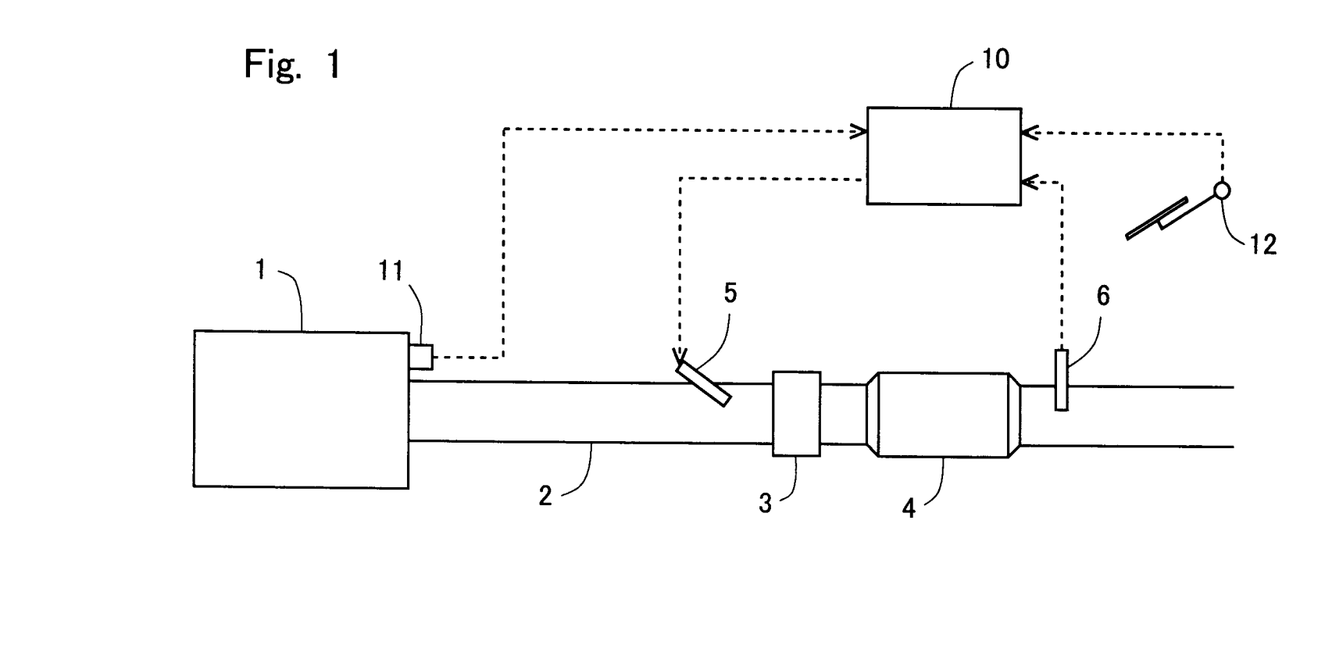
FIG. 1 shows a schematic arrangement of an exhaust system of an internal combustion engine according to an embodiment.

FIG. 1 shows a schematic arrangement of an exhaust system of an internal combustion engine according to an embodiment of the present invention. The internal combustion engine 1 is a diesel engine for driving a vehicle. However, the internal combustion engine according to the present invention is not limited to the diesel engine. The internal combustion engine may be a gasoline engine.

An exhaust gas passage 2 is connected to the internal combustion engine 1. The exhaust gas passage 2 is provided with a filter 4. The filter 4 traps PM contained in an exhaust gas. An oxidation catalyst (oxidizing catalyst) 3 is provided as the precatalyst in the exhaust gas passage 2 at a portion disposed on the upstream side from the filter 4.

A fuel addition valve 5 is provided in the exhaust gas passage 2 at a portion disposed on the upstream side from the oxidation catalyst 3. The fuel addition valve 5 adds the fuel to serve as a reducing agent into the exhaust gas. A PM sensor 6 is provided in the exhaust gas passage 2 at a portion disposed on the downstream side from the filter 4. The PM sensor 6 is a sensor which outputs the electric signal corresponding to the PM amount (outflow PM amount) contained in the exhaust gas allowed to outflow from the filter 4.

An electronic control unit (ECU) 10 is provided in combination with the internal combustion engine 1. ECU 10 is a unit which controls, for example, the operation state of the internal combustion engine 1. A crank position sensor 11 and an accelerator opening degree sensor 12 are electrically connected to ECU 10 in addition to the PM sensor 6. The crank position sensor 11 is a sensor which outputs the pulse signal corresponding to the engine rotation speed of the internal combustion engine 1. The accelerator opening degree sensor 12 is a sensor which outputs the electric signal corresponding to the accelerator opening degree of a vehicle which carries the internal combustion engine 1. The output signals of the respective sensors are inputted into ECU 10.

ECU 10 derives the engine rotation speed of the internal combustion engine 1 on the basis of the detected value obtained by the crank position sensor 11, and ECU 10 derives the engine load of the internal combustion engine 1 on the basis of the detected value of the accelerator opening degree sensor 12.

The fuel addition valve 5 is electrically connected to ECU 10. The fuel addition valve 5 is controlled by ECU 10.

<Filter Regeneration Process>

Trapped PM is deposited in the filter 4. In this embodiment, ECU 10 estimates the PM deposition amount in the filter 4 on the basis of the history of the operation state of the internal combustion engine 1. If the estimated value is not less than a predetermined threshold value, ECU 10 executes a filter regeneration process.

The filter regeneration process is realized by adding the fuel from the fuel addition valve 5. The fuel, which is added from the fuel addition valve 5, is supplied to the oxidation catalyst 3. The temperature of the exhaust gas is raised by the heat of oxidation generated by the oxidation of the fuel by the aid of the oxidation catalyst 3. As a result, the temperature of the filter 4 is raised, and PM deposited in the filter 4 is oxidized and removed.

The filter regeneration process may be realized by means of any well-known method provided that the temperature of the filter 4 can be raised to a temperature at which PM can be oxidized.

<Transition or Change of, for Example, PM Trapping Efficiency after Completion of Execution of Filter Regeneration Process>

Figure 2:
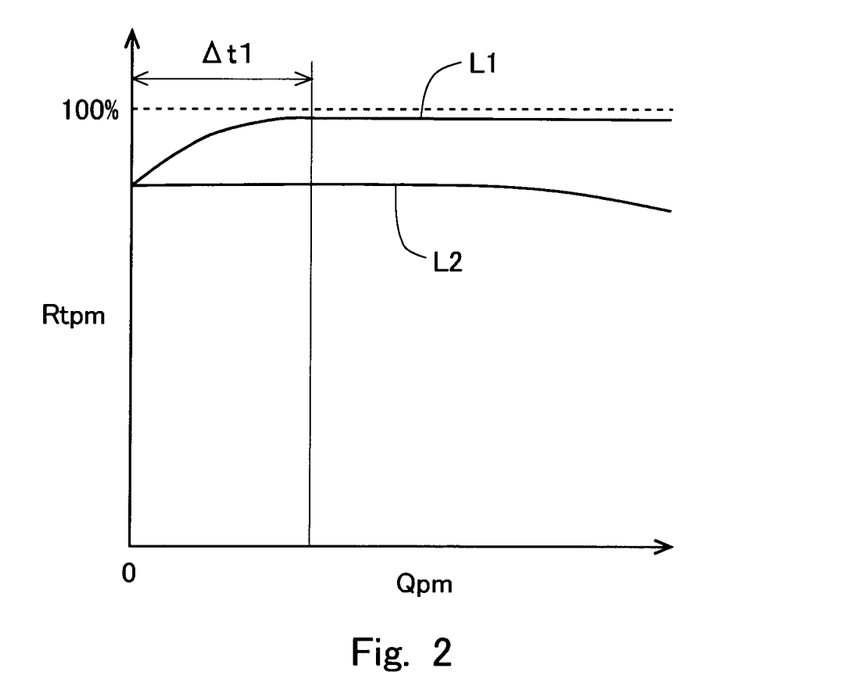
FIG. 2 shows a relationship between the PM deposition amount in a filter and the PM trapping efficiency of the filter according to the embodiment.

Next, an explanation will be made on the basis of FIGS. 2 and 3 about the transition or change of the PM deposition amount, the PM trapping efficiency, and the outflow PM amount after the completion of the execution of the filter regeneration process. FIG. 2 shows a relationship between the PM deposition amount in the filter 4 and the PM trapping efficiency of the filter 4. With reference to FIG. 2, the horizontal axis represents the PM deposition amount Qpm in the filter 4, and the vertical axis represents the PM trapping efficiency Rtpm of the filter 4. In this case, the PM trapping efficiency Rtpm is the value which indicates the proportion of the PM amount per unit time trapped by the filter 4 with respect to the PM amount per unit time allowed to flow into the filter 4. In FIG. 2, L1 indicates the transition of the PM trapping efficiency Rtpm provided when the filter 4 is normal, and L2 indicates the transition of the PM trapping efficiency Rtpm provided when the filter 4 is normal.

The PM deposition amount Qpm in the filter 4 is approximately zero at the point in time at which the execution of the filter regeneration process is completed. When the PM deposition amount Qpm is approximately zero, PM having a small particle size (grain diameter) is easily allowed to pass through the filter 4. Therefore, as shown in FIG. 2, the PM trapping efficiency Rtpm of the filter 4 is low when the PM deposition amount Qpm in the filter 4 is approximately zero as compared with when PM is deposited in the filter 4.

PM newly begins to be trapped by the filter 4 from the point in time immediately after the completion of the execution of the filter regeneration process. The PM deposition amount in the filter 4 is increased as the time elapses. When the filter 4 is normal, if the PM trapping amount is increased, then PM is hardly allowed to pass through the filter 4. Therefore, as indicated by L1 shown in FIG. 2, the PM trapping efficiency Rtpm of the filter 4 is raised in accordance with the increase in the PM deposition amount Qpm during the period of time (period of time indicated by Δt1 in FIG. 2) in which the PM deposition amount Qpm in the filter 4 arrives at a certain degree of amount from approximately zero.

However, the temperature of the filter 4 is high during the execution of the filter regeneration process. Therefore, the failure of the filter 4, which includes, for example, the dissolution loss and the breakage, tends to arise. When the failure of the filter 4 is caused as described above, even if the PM deposition amount is increased in the entire filter 4, then PM in a certain degree of amount is allowed to pass through the failure portion of the filter 4. Therefore, as indicated by L2 shown in FIG. 2, the PM trapping efficiency Rtpm of the filter 4 is hardly raised, even when the PM deposition amount Qpm is increased from the approximately zero state.

Figure 3:
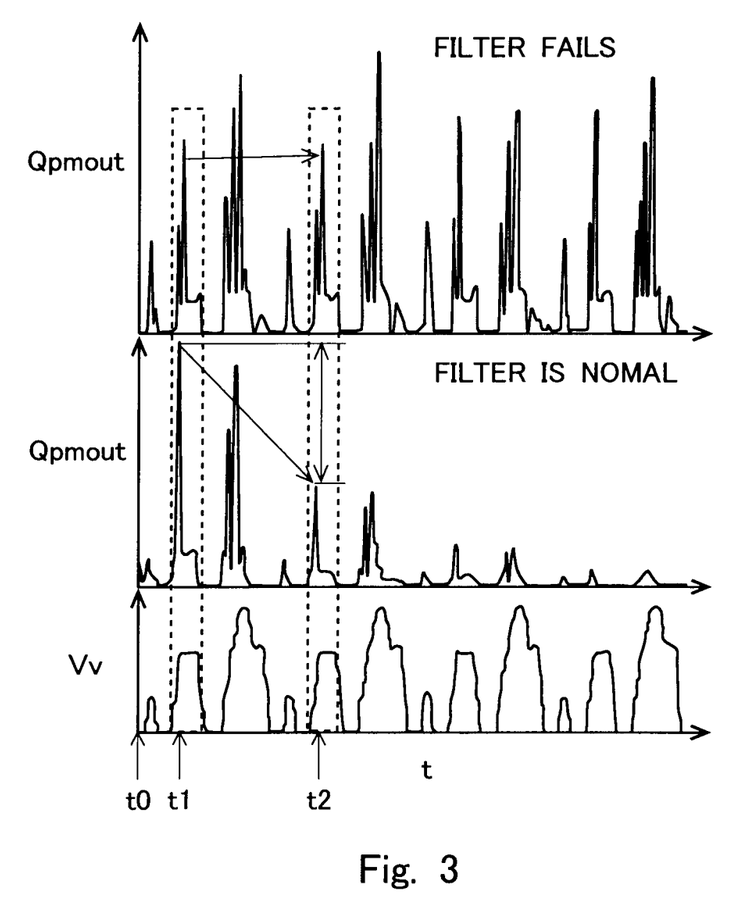
FIG. 3 shows a time chart illustrating the transition or change of the vehicle velocity of a vehicle which carries the internal combustion engine and the outflow PM amount which is provided after the completion of the execution of a filter regeneration process according to the embodiment.

FIG. 3 shows a time chart illustrating the transition or change of the vehicle velocity of the vehicle which carries the internal combustion engine 1 and the outflow PM amount which is provided after the completion of the execution of the filter regeneration process. In FIG. 3, the upper part represents the transition of the outflow PM amount Qpmout provided when the failure arises in the filter 4, the middle part represents the transition of the outflow PM amount Qpmout provided when the filter 4 is normal, and the lower part represents the transition of the vehicle velocity Vv.

As described above, when the filter 4 is normal, then the PM deposition amount is increased as the time elapses after the completion of the execution of the filter regeneration process, and the PM trapping efficiency Rtpm of the filter 4 is raised. Therefore, as shown in the middle part of FIG. 3, when the filter 4 is normal, then the outflow PM amount, which is provided at the point in time indicated by t2, is smaller, when the outflow PM amount, which is provided immediately after the completion of the execution of the filter regeneration process (at the point in time indicated by t1 in FIG. 3), is compared with the outflow PM amount which is provided thereafter when the vehicle velocity Vv is substantially the same as that obtained at the point in time indicated by t1 (at the point in time indicated by t2 in FIG. 3).

On the other hand, when any abnormality arises in the filter 4, even if the PM deposition amount is increased as the time elapses after the completion of the execution of the filter regeneration process, then the PM trapping efficiency Rtpm of the filter 4 is scarcely changed. Therefore, as shown in the upper part of FIG. 3, the outflow PM amount, which is provided at the point in time t1, is approximately the same as the outflow PM amount which is provided at the point in time t2.

<Method for Detecting Failure of Filter>

In view of the above, in this embodiment, the failure of the filter is detected on the basis of the change of the outflow PM amount after the completion of the execution of the filter regeneration process. That is, the outflow PM amount Qpmout1, which is provided immediately after the completion of the execution of the filter regeneration process, is compared with the outflow PM amount Qpmout2 which is provided thereafter. If the amount of decrease in the outflow PM amount therebetween does not arrive at a predetermined reference amount, it is judged that the filter 4 is in the failure state.

Figure 4:
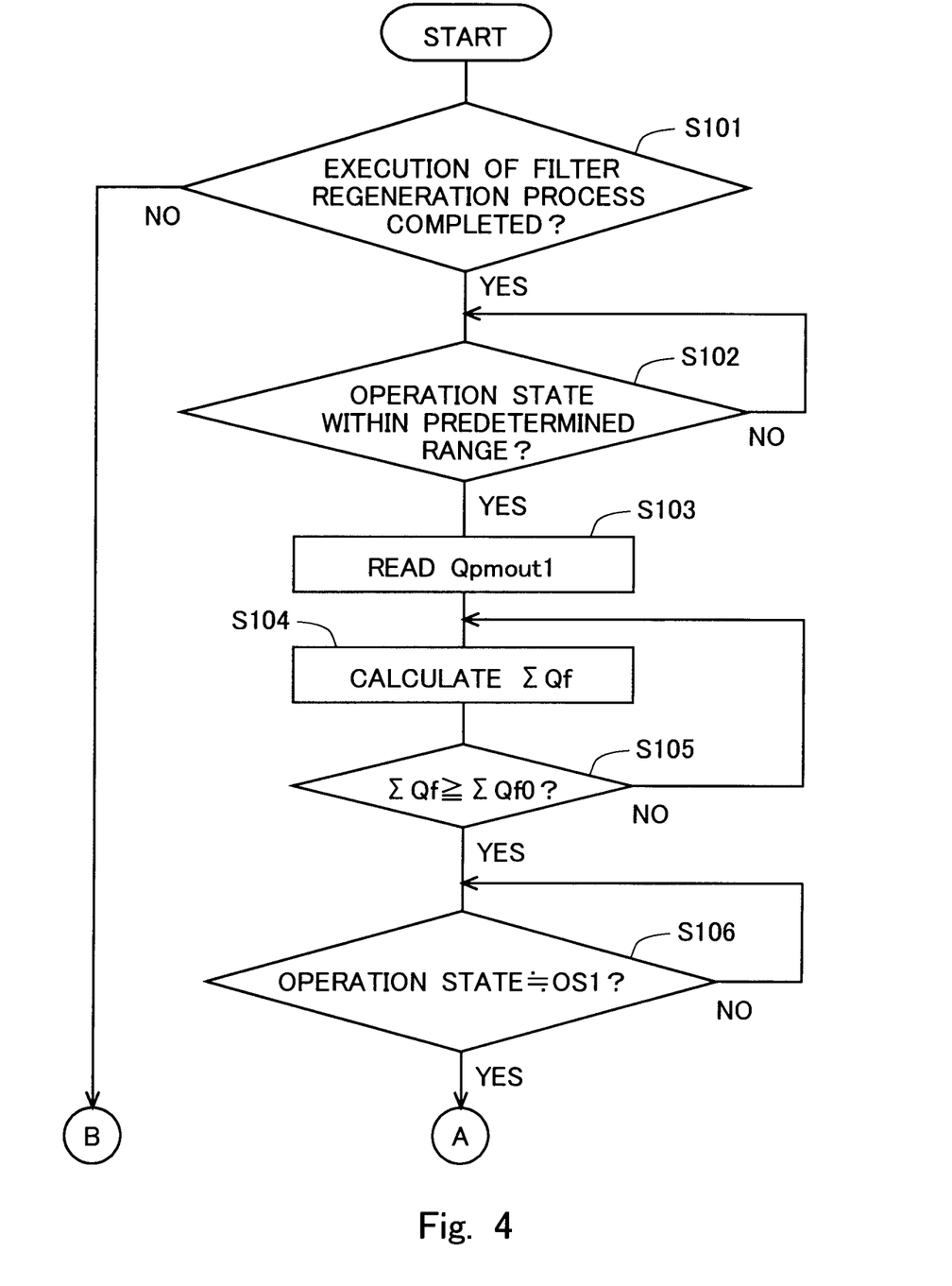
FIG. 4 shows a part of a flow chart illustrating a flow of a failure detecting method for the filter according to the embodiment.
Figure 5:
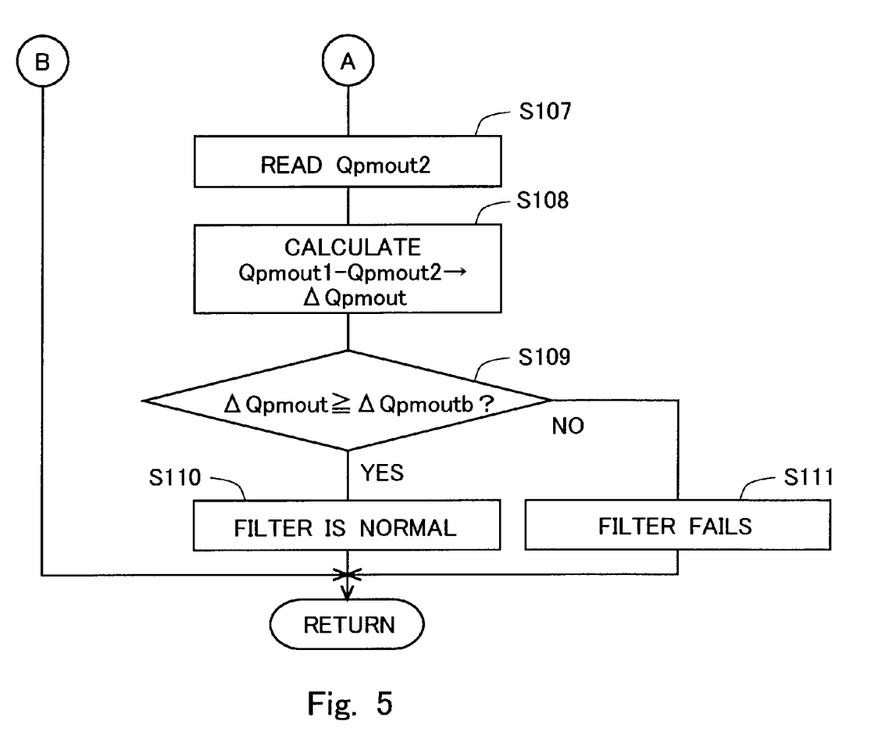
FIG. 5 shows a part of the flow chart illustrating the flow of the failure detecting method for the filter according to the embodiment.

An explanation will be made below about a flow of the method for detecting the failure of the filter according to this embodiment on the basis of flow charts shown in FIGS. 4 and 5. This flow is previously stored in ECU 10, which is repeatedly executed at predetermined intervals by ECU 10.

In this flow, at first, it is judged in Step S101 whether or not the execution of the filter regeneration process is completed. If the negative judgment is given in Step S101, the execution of this flow is once completed. If the affirmative judgment is given in Step S101, it is subsequently judged in Step S102 whether or not the operation state of the internal combustion engine 1 is within a predetermined range. The predetermined range herein refers to the range of the operation state in which the PM amount discharged or exhausted from the internal combustion engine 1 is relatively large, and the definite difference is provided in relation to the outflow PM amount depending on the PM deposition amount in the filter 4, if the filter 4 is normal. The predetermined range is previously determined, for example, on the basis of an experiment.

If the negative judgment is given in Step S102, the process of Step S102 is executed again. If the affirmative judgment is given in Step S102, the outflow PM amount Qpmout1, which is detected by the PM sensor 6 at this point in time, is subsequently read in Step S103. It is now assumed that the operation state of the internal combustion engine, which is provided when the outflow PM amount Qpmout1 is detected, is designated as OS1. Subsequently, in Step S104, the integrated value ΣQf of the fuel injection amounts in the internal combustion engine 1 as provided from the point in time of the detection of the outflow PM amount Qpmout1 is calculated.

Subsequently, it is judged in Step S105 whether or not the integrated value ΣQf of the fuel injection amounts in the internal combustion engine 1 is not less than a predetermined integrated value ΣQf0. The predetermined integrated value ΣQf0 is herein the value with which it can be judged that the PM deposition amount in the filter 4 is increased to such an extent that the PM trapping efficiency of the filter 4 is definitely raised as compared with that provided at the point in time at which the outflow PM amount Qpmout1 is detected, if the filter 4 is normal. The predetermined integrated value $\Sigma Qf0$ is previously determined, for example, on the basis of an experiment.

If the negative judgment is given in Step S105, the process in Step S104 is executed again. If the affirmative judgment is given in Step S105, it is subsequently judged in Step S106 whether or not the operation state of the internal combustion engine 1 is substantially the same as OS1. In this case, the substantially the same range is such a range that the PM amounts discharged or exhausted from the internal combustion engine 1 are substantially identical with each other.

If the negative judgment is given in Step S106, the process in Step S106 is executed again. If the affirmative judgment is given in Step S106, the outflow PM amount Qpmout2, which is detected by the PM sensor 6 at this point in time, is subsequently read in Step S107.

Subsequently, in Step S108, the outflow PM amount Qpmout2, which is read in Step S106, is subtracted from the outflow PM amount Qmout1 which is read in Step S103, and thus the decreased amount $\Delta$Qpmout in the outflow PM amount is calculated.

Subsequently, in Step S109, it is judged whether or not the decreased amount $\Delta$Qpmout in the outflow PM amount is not less than a predetermined reference amount $\Delta$Qpmoutb. In this case, the predetermined reference amount $\Delta$Qpmoutb is the threshold value of the amount of decrease in the outflow PM amount with which it is possible to judge that the filter 4 is normal. The predetermined reference amount $\Delta$Qpmoutb is previously determined, for example, on the basis of an experiment. The predetermined reference amount $\Delta$Qpmoutb may be changed depending on the operation state of the internal combustion engine 1 provided when the outflow PM amount Qpmout1, Qpmout2 is detected.

If the affirmative judgment is given in Step S109, it is subsequently judged in Step S110 that the filter 4 is normal. On the other hand, if the negative judgment is given in Step S109, it is subsequently judged in Step S111 that failure arises in the filter 4.

If the filter 4 is normal, the PM trapping efficiency of the filter 4 immediately begins to rise after the completion of the execution of the filter regeneration process. Therefore, according to the method for detecting the failure of the filter as described above, the failure of the filter 4 can be immediately detected after the completion of the execution of the filter regeneration process in which the failure of the filter 4 tends to arise. Further, the judgment itself to judge whether or not the failure arises in the filter 4 can be performed in an extremely short period of time as well.

The change of the amount of decrease in the outflow PM amount after the completion of the execution of the filter regeneration has a high sensitivity with respect to the degree of the failure of the filter 4 as compared with the change of the differential pressure between the upstream and the downstream of the filter 4. In other words, even when the portion of the filter 4, which suffers from the dissolution loss or the breakage, is small, the difference easily arises in the value of the amount of decrease in the outflow PM amount after the completion of the execution of the filter regeneration, as compared with the situation in which the filter 4 is normal. Therefore, it is possible to detect the failure of the filter 4 more highly accurately.

In the flow as described above, the point in time, at which the reading of the next outflow PM amount Qpmout2 is executed after the reading of the first outflow PM amount Qpmout1, is determined on the basis of the integrated value $\Sigma Qf$ of the fuel injection amounts in the internal combustion engine 1. However, the point in time can be also determined simply on the basis of the elapsed time. Alternatively, the point in time can be also determined on the basis of an estimated value of the PM deposition amount in the filter 4 as obtained if it is assumed that the filter 4 is normal.

In this embodiment, it is appropriate that at least a part of the period of time in which the PM trapping efficiency Rtpm is raised depending on the increase in the PM deposition amount Qpm in the filter 4 (i.e., the period of time indicated by $\Delta t1$ in FIG. 2) is included between the point in time at which the first outflow PM amount Qpmout1 is read and the point in time at which the next outflow PM amount Qpmout 2 is read. For example, both of the first outflow PM amount Qpmout1 and the next outflow PM amount Qpmout2 may be read during the period of time indicated by $\Delta t1$ in FIG. 2. Further, the outflow PM amount may be read at three points or more after the completion of the execution of the filter regeneration, and the decreased amount in the outflow PM amount may be calculated on the basis of obtained values.

In the flow as described above, the point in time, at which the first outflow PM amount Qpmout1 is read, is the point in time at which it is judged that the operation state of the internal combustion engine 1 is within the predetermined range after the completion of the execution of the filter regeneration process. However, it is not necessarily indispensable that the operation state of the internal combustion engine 1 should be within the predetermined range. It is also allowable that the first outflow PM amount Qpmout1 is read at the point in time at which the execution of the filter regeneration process is completed. However, it is possible to further improve the accuracy of the failure detection for the filter 4 when the point in time, at which the first outflow PM amount Qpmout1 is read, is the point in time at which the operation state of the internal combustion engine 1 is within the predetermined range.

In the flow as described above, the decreased amount in the outflow PM amount is calculated on the basis of the outflow PM amounts at the two points provided when the operation states of the internal combustion engine 1 are substantially identical with each other. However, it is not necessarily indispensable that the operation states of the internal combustion engine 1, which are provided when the outflow PM amounts are detected at the two points, should be substantially identical with each other. For example, the decreased amount in the outflow PM amount can be calculated on the basis of the outflow PM amounts obtained at two points as detected in different operation states, while considering the difference between the operation states, and it is also possible to judge whether or not the failure arises in the filter 4 on the basis of an obtained calculated value. However, it is possible to further improve the accuracy of the failure detection for the filter 4 when the decreased amount in the outflow PM amount is calculated on the basis of the outflow PM amounts obtained at the two points when the operation states of the internal combustion engine 1 are substantially identical with each other, and it is judged whether or not the failure arises in the filter 4 on the basis of the obtained calculated value.

DESCRIPTION OF THE REFERENCE SIGNS

1: internal combustion engine
2: exhaust gas passage
3: oxidation catalyst
4: particulate filter
5: fuel addition valve
6: PM sensor
10: ECU 11: crank position sensor
12: accelerator opening degree sensor

The invention claimed is:

1. A failure detecting apparatus for detecting failure of a particulate filter which is provided in an exhaust gas passage of an internal combustion engine and which traps particulate matters contained in an exhaust gas, the failure detecting apparatus for detecting the failure of the particulate filter comprising:
 a PM sensor which detects an amount of particulate matter contained in the exhaust gas allowed to outflow from the particulate filter;
 an electric control unit including logic that, when executed, performs the steps of:
 executing a filter regeneration process for oxidizing and removing particulate matter deposited in the particulate filter; and
 judging that the particulate filter is in the failure state if a decreased amount of the amount of particulate matter contained in the exhaust gas detected by the PM sensor, during a predetermined period of time as started from a point in time at which the filter regeneration process is completed, is not equal to or larger than a predetermined reference amount;
 wherein the predetermined period of time is the period of time including at least a part of the period of time in which PM trapping efficiency is raised as the time elapses if the particulate filter is normal.

2. The failure detecting apparatus for detecting the failure of the particulate filter according to claim 1, wherein the electric control unit compares the amounts of particulate matter contained in the exhaust gas detected by the PM sensor at least at two points when substantially identical operation states of the internal combustion engine are provided during the predetermined period of time, and judges that the particulate filter is in the failure state if the decreased amount of the amount of particulate matter is not equal to or larger than the predetermined reference amount.

* * * * *